Dec. 12, 1933.  E. P. LARSH  1,939,399
ELECTRIC FAN
Filed Feb. 8, 1932
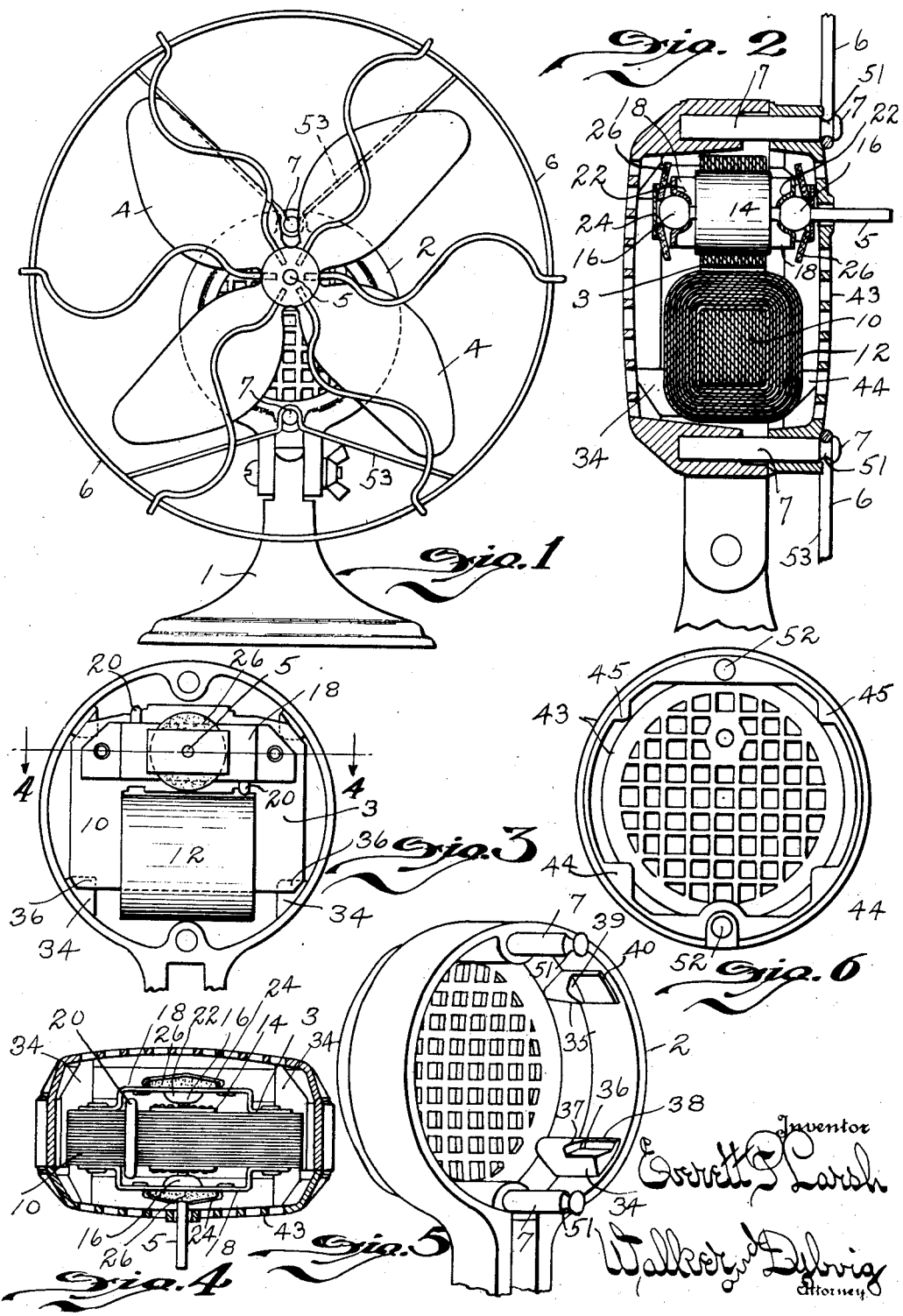

Patented Dec. 12, 1933

1,939,399

UNITED STATES PATENT OFFICE 1,939,399

ELECTRIC FAN

Everett P. Larsh, Vandalia, Ohio, assignor to The Master Electric Company, Dayton, Ohio, a corporation of Ohio Application February 8, 1932. Serial No. 591,705

9 Claims. (Cl. 172—278)

This invention relates to electric fans of the portable stand type, and particularly to a fan embodying an induction type motor of small compact form enclosed in a nonmagnetic casing preferably of phenolic condensation or synthetic resinous material, but which may be aluminum, brass, or any other nonmagnetic material.

The object of the invention is to simplify the construction as well as the means and mode of operation of electric fans, whereby they will not only be cheapened in construction, but will be more efficient in operation, of small compact form, possessing high operation characteristics, and unlikely to get out of order.

A further object of the invention is to enable the use of a shading ring type of induction motor by loosely mounting the motor in a casing or housing therefor of suitable nonmagnetic material wherein flux losses and eddy currents through the housing will be obviated.

A further object of the invention is to provide a transformer type of induction motor housed in a ventilated casing of low heat conductivity in such relation that warping of the casing and expansion or contraction of the parts will not subject the rotor and shaft to strain or resistance.

A further object of the invention is to provide an improved mounting for the motor within such casing whereby the rotor shaft bearings are carried by the motor stator wholly independent of the casing.

A further object of the invention is to provide an improved mounting for the motor shaft whereby the bearings thereof will be free for self aligning adjustment.

A further object of the invention is to keep the magnetic leakage at a minimum. This has been accomplished by making the casing of nonmagnetic material so as to prevent leakage through the casing.

A further object of the invention is to provide an improved form of guard mounting for the fan, whereby the fan guard is utilized to lock the motor in its casing.

An important feature of the invention is the provision of a motor and casing therefor of electric and heat insulating character which may be easily and quickly assembled and having large tolerances, thereby effecting economies of manufacture and facilitating assembly and providing a construction which will operate efficiently under varying conditions without binding.

With the above primary and other incidental objects in view, as will more fully appear in the specification, the invention consists of the features of construction, the parts and combinations thereof, and the mode of operation, or their equivalents, as hereinafter described and set forth in the claims.

In the drawing wherein is shown the preferred, but obviously not the only form of embodiment of the invention, Fig. 1 is a front elevation of an assembled fan embodying the present invention. Fig. 2 is an enlarged vertical sectional view through the housing or casing showing the motor therein in end elevation. Fig. 3 is a front elevation of the motor and casing with the cover or head of the casing removed. Fig. 4 is a sectional plan view of the casing substantially on line 4—4 of Fig. 3, showing the motor in top plan view. Fig 5 is a perspective view of the motor casing from which the motor has been removed. Fig. 6 is an interior view of the casing head.

Like parts are indicated by similar characters of reference throughout the several views.

The electric fan, forming the subject matter hereof, is adapted for economical production in a relatively small size, but which will possess high efficiency characteristics. In its general shape and proportions it follows the standard conventional style and external appearance, but obviously may be variously embellished, or suitable ornamental design may be incorporated therein, as for example that shown in design patent to Meyer No. D-83,636 of March 10, 1931.

The fan comprises a base or standard 1, carrying at its top a circular pivotally connected motor housing or casing 2 within which is mounted an induction motor 3 of simplified compact form, the shaft of which, due to the style and shape of the motor, projects eccentrically relative to the circular motor casing, being upwardly offset from the center of the motor casing. Carried by the motor shaft 5 are rotary fan blades 4 enclosed within a wire guard 6 mounted upon the motor casing 2 in such manner that the guard serves to secure the casing head and motor in place by engagement with duo-functional mounting studs 7 projecting from the main portion of the casing.

The motor 3 preferably, though not necessarily, comprises a laminated stator 10 of substantially rectangular open frame like construction, about the lower transverse portion of which is mounted the field winding 12, while rotatively disposed in the upper transverse portion is a squirrel cage type rotor 14, the shaft 5 of which is mounted in suitable bearings 16 in bearing brackets 18 preferably of brass or other nonmagnetic material, but which for certain conditions of use may comprise magnetic material by variation of the mass of which different operating characteristics may be produced. Disposed on each side of the rotor 14 and enclosing portions of the respective poles are one or more shading rings or coils 20 which afford to the motor improved starting torque which is notoriously old. The rotor shaft 5 is provided with selfaligning bearings 16 of substantially spherical form which are seated in corresponding concavities 22 formed in the lateral bearing brackets 18 within which the bearings are capable of a limited universal adjustment to insure free running condition and minimum resistance. The bearing members 16 are held in their seats by bow springs 24, the ends of which are engaged with the brackets 18 at opposite sides of the bearing members 16. Absorbent pads 26, to receive lubricant, are interposed between the retaining springs 24 and the bearing members 16.

The motor casing or housing 2 is preferably, though not necessarily, formed from dielectric and heat insulating material being molded from phenolic condensation material of a synthetic resinous compound, but may be formed of aluminum or other non-magnetic metal.

A motor of the present type is subject to certain flux leakage, current losses and eddy currents which materially affect the operating efficiency in the event an electro-conductive or magnetic body is interposed within the magnetic field of the motor. The use of a motor casing molded from insulating or dielectric material minimizes such losses and materially improves the performances of the motor. Likewise a shading ring type of motor develops considerable heat under certain operative conditions which may be transmitted to other parts of the motor through adjacent portions of the casing and may cause the casing to become uncomfortably hot for handling while the motor is in operation. Such heating of the motor housing over which the transmitted air is traveling, tends to further lower the cooling efficiency of the fan. Therefore, the use of a molded casing of phenolic condensation or synthetic resinous molding compound or analogous non-electro and heat conductive material having dielectric and heat insulating properties, enables the utilization of the present type of motor which in other forms of encasement would not perform so efficiently.

To facilitate the assembly and prevent the operation of the motor being influenced by warming, expansion or contraction of the casing parts, the rotor shaft bearings have no connection whatsoever with the casing and the motor is somewhat loosely supported in the casing by the engagement therewith of the stator wholly independently of any engagement of the bearing brackets or rotor shaft mountings with the casing. To this end the motor casing 2 is provided interiorly with four seats or lugs 34 and 35 disposed to agree with the corners of the motor stator which are chamfered to conform thereto. The lowermost supporting lugs 34 are notched or recessed as at 36 to receive the lower corners of the stator and upon which the bottom of the stator rests. Such notches terminate in spaced relation with the casing head forming stop shoulders 37, which confine the motor to a predetermined intermediate position within the casing, preventing lateral shifting thereof. The outer sides of the notches 36 in the lugs 34 are of increased thickness forming pads 38 against which the beveled lower corners of the stator abut.

The upper locating lugs 35 for the motor are shouldered at 39 similarly to the shoulders 37 to confine the motor and limit lateral play thereof. The lugs 35 afford areas or pads 40 of increased thickness of the casing walls against which the chamfered upper corners of the stator abut. Thus the motor 3 is loosely supported within the casing at its four corners wholly independently of other connection or interlocking engagement with the casing. To confine the motor within the notches 36 against lateral displacement, the head or cover 43 of the housing or casing is provided with lugs 44 and 45 which register with the lugs 34 and 35 and afford lateral stops at the front of the motor corresponding to the shoulders 37 and 39 which loosely hold the motor against displacement.

The casing 3 is provided with studs 7 fixedly embedded therein, which studs are peripherally grooved adjacent their ends at 51 to receive the fan guard 6. The casing head 43 is provided with holes 52 therein through which the studs 7 project. The head 43 is freely slidable onto and off the studs and is held thereon by the engagement of the fan guard 6 with the studs. The fan guard which may be of any desired configuration includes substantially V-shaped portions 53 which are engageable within the peripheral grooves 51 of the studs to retain the head 43 in adjusted position. The guard portions 53 are engageable with and disengageable from the studs by flexing the guard.

From the foregoing description it can be readily seen that the rotary shaft 4 and the rotor 14 are journalled in bearings wholly independent of the casing 2 so that unequal expansions of the metallic parts with respect to the non-metallic parts due to changes in temperature and vice versa, cannot cause a binding action upon the rotor shaft. If the shaft was subject to deflection caused by any unequal expansion due to the heating of the motor, it would cause a binding upon the rotor shaft and a displacement of the rotor with respect to the stator so that the rotor would be eccentrically mounted. Any binding upon the shaft and any variation in the air gap intermediate the rotor and stator, as is well known to those skilled in the art, greatly reduces the efficiency of the motor. The fan guard, by its engagement with the studs 7, retains the head of the casing in position and thereby confines the motor which otherwise loosely rests in the supporting seats 34—35.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In an electric fan, an induction motor of the shading ring type, including a stator of the core type, a field winding thereon and a squirrel cage rotor, bearing brackets for said rotor carried upon said stator, rotor bearings therein capable of universal adjustment, a ventilated casing of non-magnetic material enclosing the motor, seats formed in said casing with which the stator engages, the rotor being supported wholly independent of said casing, whereby unequal expansion of the stator and casing will not influence the rotor so as to decrease the efficiency of the motor.

2. In an electric fan, a motor including a stator of the core type, a field winding, and a squirrel cage rotor, a casing of non-magnetic material therefor, said casing having seats upon which the stator of said motor is mounted, so that the magnetic flux will not be by-passed through the casing, bearings for said rotor independent of said casing, whereby unequal expansion of said casing and said motor parts will not influence the rotor so as to thereby change the efficiency of the motor.

3. In an electric fan, an induction motor having a stator of the core type, a rotor, and bearings for rotatively supporting said rotor, supporting members for said bearings, said supporting members having sockets therein for receiving the bearings to permit self-alignment thereof, a casing for said motor made of molded dielectric heat insulating material, said casing having supports upon which the motor is mounted, apertures in the end walls of said casing for permitting the circulation of the air through said casing to cool the motor, the non-magnetic casing increasing the efficiency of the motor by preventing leakage of the magnetic flux therethrough.

4. In an electric fan, an electric motor including a stator of the core type, a rotor, and bearings for rotatively supporting said rotor supported by said stator, a housing of nonmagnetic material enclosing said motor, said housing having seats upon which the stator is supported, the end walls of said housing being independent of the rotor mounting so that unequal expansion of the motor and the casing will not decrease the efficiency of the motor.

5. In an electric fan, the combination of an induction motor including a stator having a pair of spaced parallel portions joined at their ends, an energizing winding linking said stator, shading coils linking portions of said stator for magnetizing same, a squirrel cage rotor, said rotor being located in the magnetic path of said stator, a shaft supporting said rotor, a pair of self aligning bearings for rotatively supporting said shaft and rotor, a pair of nonmagnetic brackets carried by said stator carrying said bearings, with a casing of dielectric heat insulating material, said casing being nonmagnetic and including a cup shaped member having a plurality of seats for snugly receiving the motor, a second member co-operating with said first member to enclose said motor, one of said members having an offset opening for receiving said shaft, opposite faces of said casing having a group of rectilinear open spaces for circulating air around said stator and shading coils so as to ventilate and cool the motor.

6. An induction type electric motor including a stator of the core type, a field winding thereon, a squirrel cage rotor, bearings carried by the stator in which the rotor is rotatively supported, a casing for the motor of molded synthetic resinous material serving to increase the efficiency of the motor by preventing leakage of magnetic flux through the casing, apertured end walls for the casing permitting circulation of air to cool the motor, and a motor supporting portion integral with the casing with which said motor has supporting engagement within the casing entirely independently of the end walls thereof whereby unequal expansion of the casing and motor parts will not influence the efficiency of the motor.

7. An induction type electric motor including a stator of the core type, a field winding thereon, a squirrel cage rotor, bearings carried by the stator in which the rotor is rotatively supported, a casing for the motor including apertured end walls for the circulation of air to cool the motor, and a motor supporting portion integral with the casing with which said stator has supporting engagement within the casing entirely independently of the end walls thereof whereby unequal expansion of the casing and motor parts will not influence the efficiency of the motor.

8. An induction type electric motor, including a stator of the core type, a field winding thereon, a squirrel cage rotor, a casing for the motor of molded synthetic resinous material serving to increase the efficiency of the motor by preventing leakage of magnetic flux through the casing, including a motor supporting portion, and bearings in which the rotor is rotatively supported carried by the stator independently of the casing.

9. An induction type electric motor including a stator of the core type, a field winding thereon, a squirrel cage rotor, a casing with which the stator has supporting engagement, bearings in which the rotor is rotatively supported carried by the stator independently of the casing, said casing for the motor comprising non-metallic material and serving to increase the efficiency of the motor by preventing leakage of magnetic flux through the casing.

EVERETT P. LARSH.